(No Model.)
W. S. O'BRIEN.
SPOON.
No. 457,748.           Patented Aug. 11, 1891.
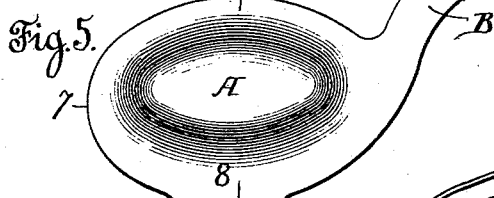
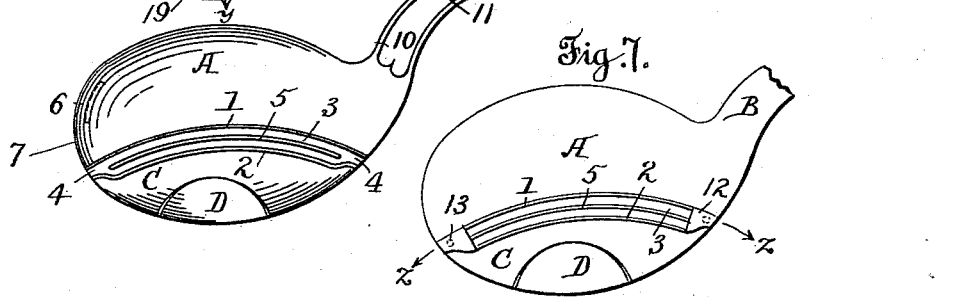
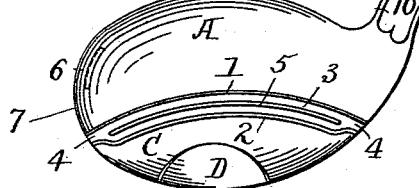
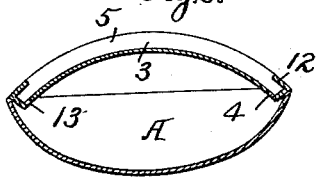
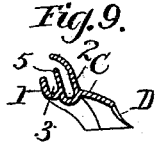
Witnesses.
Inventor.
Wm S O'Brien

UNITED STATES PATENT OFFICE.

WILLIAM S. O'BRIEN, OF SAN FRANCISCO, CALIFORNIA.

SPOON.

SPECIFICATION forming part of Letters Patent No. 457,748, dated August 11, 1891.

Application filed April 23, 1891. Serial No. 390,097. (No model.)

*To all whom it may concern:*

Be it known that I, WILLIAM S. O'BRIEN, a citizen of the United States, residing at San Francisco, in the county of San Francisco and State of California, have invented certain new and useful Improvements in Spoons, of which the following is a specification.

This invention has for its object to produce a spoon which is especially adapted to be used in the eating of soups, and particularly by those persons having mustaches or beards; and the invention consists in a certain novel construction of the spoon-bowl, and in a cover or guard extending over a portion of the bowl and having a flanged edge or portion of novel construction. It further consists of a covered soup or mustache spoon, the handle of which is arranged in a peculiar manner to be described, and also of a spoon having a stop, catch, or rest whereby it may be supported with the hollow portion of the bowl upward upon the side of the plate.

In the drawings, Figure 1 is a side or edge view of a spoon provided with my improvements. Fig. 2 is a plan view of the same. Fig. 3 is a cross-sectional view on the line $x$ $x$ of Fig. 1. Fig. 4 shows several forms of the supporting projection or rest. Fig. 5 is a plan view showing certain features of my invention applied to a spoon without a cover or guard. Fig. 6 is a cross-section on the line $y$ $y$ of Fig. 5. Fig. 7 is a plan view illustrating a modification of one part of the invention. Fig. 8 is a section on the line $z$ $z$ of Fig. 7. Fig. 9 is a sectional view illustrating a modified form of the triple flange along the edge of the cover or guard.

A represents the bowl of the spoon, and B the handle thereof.

Extending over a portion of the bowl of the spoon is a cover or guard C, in which is formed an opening D, through which the soup or the liquid food is taken. The bowl of the spoon is of novel shape in several particulars.

Spoons as ordinarily shaped usually have the bowl portions taper to more or less of a point opposite the end to which the handle is secured. In dipping with such a spoon the tendency is to insert the point more deeply into the liquid than any portion of the bowl, and consequently if the spoon is provided with a cover it is almost impossible to prevent a portion at least of the cover from becoming wet on its upper surface. In order to overcome this tendency, I round the outer or what is usually the point end of the bowl, making this portion as wide as or even wider than the other portions of the spoon-bowl, as shown at 7, Fig. 2. With a spoon having its bowl thus shaped it is easy to dip from a plate or other vessel, and it almost entirely removes the liability of so inserting the spoon into the liquid that the cover, when one is used, will be immersed. The outer edge of the spoon-bowl is flared outward slightly, as shown at 15 in Figs. 3 and 6. This I have found makes it easier to quickly fill the bowl than when the outer edge of the spoon is made concave on its inner surface from the bottom of the bowl to its upper edge, as is now ordinarily done.

Another feature of this construction which I consider new and advantageous is illustrated in Fig. 3. Examining this figure, it will be observed that that edge or side of the spoon-bowl from which the soup is taken by the person eating is flared outward and made more flat and shallow than the other side, as indicated at 8. The advantage which arises from this construction is that the soup is better directed to the opening D in the cover and is more easily taken into the mouth than when the bowl is shaped in the usual manner. This feature of construction, as well as the one last described, may be applied to a spoon without a cover, as shown in Fig. 5. In such a spoon I prefer that the flared or shallow edge 8 shall have an indentation 9 at the place where the lips are applied to the edge of the bowl, and in addition to the indentation this portion of the edge of the bowl may be extended outward slightly, as shown at 19, Fig. 5. It will be also understood that the constructions just described are applicable to spoons generally, whether covered or not.

There always is more or less danger in using a covered spoon of the soup overrunning the top of the cover, from which the mustache becomes soiled. To guard against this tendency it has been proposed to flange the inner edge of the cover, and this to a certain extent is satisfactory; but even with a flanged cover the top thereof will often become soiled by reason of the soup overflowing the flange or passing around the edges thereof upon the top of the cover. In order, therefore, to effectively guard against this danger I provide the inner edge of the cover or guard with a double or triple flange, whereby there is produced a channel between the flanges open at the sides, into which channel any soup which may overrun the flange will flow and be thereby guided off from the cover. The preferred form of this channel-way or double flange is that represented in Figs. 1, 2, and 3. 1 represents a flange extending along the entire inner edge of the cover, and 2 is another flange situated at a short distance from the flange 1, so that there is formed between them a channel 3, open at its ends 4, so that any liquid which might possibly overrun the flange 1 would be caught in the channel 3 and escape therefrom at the ends, and upper surface of the cover be kept dry and clean. 4 is another flange situated between the flanges 1 and 2 in the channel 3. It is somewhat higher than the flanges 1 and 2 and serves to prevent any liquid which might overrun the flange 1 from continuing on and flowing over the flange 2, and also as a stop or guard to prevent the mustache of the person using the spoon from projecting over the inner edge of the cover and becoming soiled by the contents of the spoon-bowl.

I do not wish to be limited to the precise construction and arrangement of the triple flange, as shown in Figs. 2 and 3, as slight modifications will readily suggest themselves. Thus the flange 2 might be as high or even higher than the flange 5, and it might be made to curve over the other flanges and act as a guard or deflector for the mustache, to prevent its coming in contact with any liquid which might overrun into the channel 3—such a construction as illustrated in Fig. 9. The handle B of the spoon joins the bowl at an angle, the portion 10, which connects with the bowl, being inclined away from the cover C and then bending, as at 11, so that the outer portion of the spoon-handle lies substantially parallel with a line drawn through the longitudinal axis of the bowl A, but to one side thereof. This arrangement of the spoon-handle is found to facilitate the dipping operation, particularly when a spoon having a cover or guard is being used. It also insures that the central portion of the inner edge of the spoon, rather than the point or end thereof, shall be brought to the mouth by the natural and easy motion of the arm as it moves to carry the spoon-bowl to the mouth.

6 designates a projection situated upon the outside of the spoon-bowl near the point and joining the bowl on its side toward the handle at an angle, so that it forms a sort of hook or rest, which is adapted to engage with the edge or rim of a plate or other vessel and hold the spoon suspended above the table on which the plate may be rested, the end of the handle of course resting upon the table.

It is not practicable to rest a covered soup or mustache spoon upon a plate or other rest with the concave side of the bowl downward, as the bowl would drain and drip upon the cloth, nor is it practicable to leave the spoon in the vessel containing the liquid food, as may be done with an ordinary spoon, as this would cause the spoon-cover to be wet and soiled. The stop or rest just described provides a means whereby the spoon may be supported when not in use with the concave side of the bowl upward, and thus avoid the objections just referred to.

In Figs. 7 and 8 there is shown a modification of that part of my invention which relates to the double flange and channel-way along the edge of the cover. Instead of leaving the channel 3 open at its outer ends, in this construction it is shown as being closed and covered for a short distance, as at 12, and the openings 13 through the cover C, through which the soup escapes from the channel-way, are formed below the covered or tubular portions 12 thereof and open into the spoon-bowl. I prefer, however, the construction shown in Figs. 1, 2, and 3 to that just described.

Without limiting myself to the precise shape, construction, and arrangement of the parts of my invention shown and described, what I claim is—

1. A spoon provided with a cover having along its inner edge a flange and channel-way outside the flange, substantially as set forth.

2. A spoon having a cover provided with a flange along its inner edge and with a channel-way outside of the flange, there being at the ends of the channel-way openings to permit the escape of any liquid which may be caught in the channel-way, substantially as set forth.

3. A spoon provided with a cover having along its inner edge the flange 1 and having the flange 2 outside of the flange 1, whereby there is formed a channel-way between the said flanges, and a third flange 5, situated in the channel-way between the flanges 1 and 2, substantially as set forth.

4. A spoon having on the outside of its bowl portion near the point thereof a projection 6, which joins the bowl on the side toward the handle at an angle, whereby there is formed a rest adapted to hook over the edge of a plate and suspend the spoon with the concave portion of the bowl upward, substantially as set forth.

In testimony whereof I affix my signature in presence of two witnesses.

WILLIAM S. O'BRIEN.

Witnesses:
EUGENE F. BERT,
EDWARD CRISP.